(12) United States Patent
Boerger et al.

(10) Patent No.: US 11,445,366 B2
(45) Date of Patent: Sep. 13, 2022

(54) KEY MANAGEMENT ON A MULTI-MODAL COMMUNICATIONS DEVICE

(71) Applicant: MOTOROLA SOLUTIONS, INC., Chicago, IL (US)

(72) Inventors: Mark A. Boerger, Plantation, FL (US); Edward Licht, Boynton Beach, FL (US); Saeed Tasharofi, Tamarac, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 154 days.

(21) Appl. No.: 16/549,761

(22) Filed: Aug. 23, 2019

(65) Prior Publication Data

US 2021/0058779 A1 Feb. 25, 2021

(51) Int. Cl.
*H04W 12/041* (2021.01)
*H04W 76/15* (2018.01)
(Continued)

(52) U.S. Cl.
CPC ..... *H04W 12/041* (2021.01); *H04W 28/0226* (2013.01); *H04W 28/0247* (2013.01); *H04W 72/048* (2013.01); *H04W 76/15* (2018.02)

(58) Field of Classification Search
CPC .......... H04W 12/041; H04W 12/0433; H04W 28/0226; H04W 28/0247; H04W 72/048; H04W 76/15; H04W 88/06; H04L 63/062
(Continued)

(56) References Cited

U.S. PATENT DOCUMENTS

| | | |
|---|---|---|
| 5,261,117 A | 11/1993 | Olson |
| 6,915,130 B1 | 7/2005 | Chapman et al. |
| 2012/0183143 A1* | 7/2012 | Kruegel ................. H04L 9/083 380/277 |

FOREIGN PATENT DOCUMENTS

| | | |
|---|---|---|
| EP | 2790377 A1 | 10/2014 |
| WO | 0076194 A1 | 12/2000 |
| WO | 2018063268 A1 | 4/2018 |

OTHER PUBLICATIONS

International Search Report and Written Opinion for Application No. PCT/US2020/043572 dated Sep. 21, 2020 (14 pages).

* cited by examiner

*Primary Examiner* — Philip Sobutka
(74) *Attorney, Agent, or Firm* — Michael Best & Friedrich LLP

(57) ABSTRACT

Methods for managing a device and said device configured to communicate on multiple radio communication systems. The communications device includes a memory and an electronic processor electrically connected to the memory. The processor is configured to store a plurality of keymaps, each keymap of the plurality of keymaps corresponding to at least one of a particular communication system of the multiple radio communication systems and operate, in response to a user input, on a first radio communication system of the multiple radio communication systems. The processor is further configured to manage traffic operations to and from a communication system according to a first keymap of the plurality of keymaps corresponding to the first communication system when the electronic processor is operating on the first radio communication system and perform a key management operation of a selected second keymap corresponding to a second radio communication system in response to receiving a command.

16 Claims, 5 Drawing Sheets

(51) Int. Cl.
*H04W 72/04* (2009.01)
*H04W 28/02* (2009.01)

(58) Field of Classification Search
USPC .................................. 455/410, 411, 518–520
See application file for complete search history.

KEY MANAGEMENT ON A MULTI-MODAL COMMUNICATIONS DEVICE

BACKGROUND OF THE INVENTION

Some communications devices, for example, mobile telephones and two-way radios, provide encryption functionality. In some cases, communications are encrypted before they are transmitted. Likewise, communications are decrypted once they are received. In some cases, encryption and decryption is carried out using shared secret keys. For example, a set of communication devices used by first responders will use symmetrical encryption to secure communications between the devices. Communication systems used by first responders are restricted. For example, a police department located in Miami-Dade County, Fla., United States of America, will operate or manage, for example, a trunked radio system that uses a set of keys or key material (set of keys and metadata). However, a first responder communication system in an adjacent county, for example, Broward County, Fla., United States of America, will use different key material.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
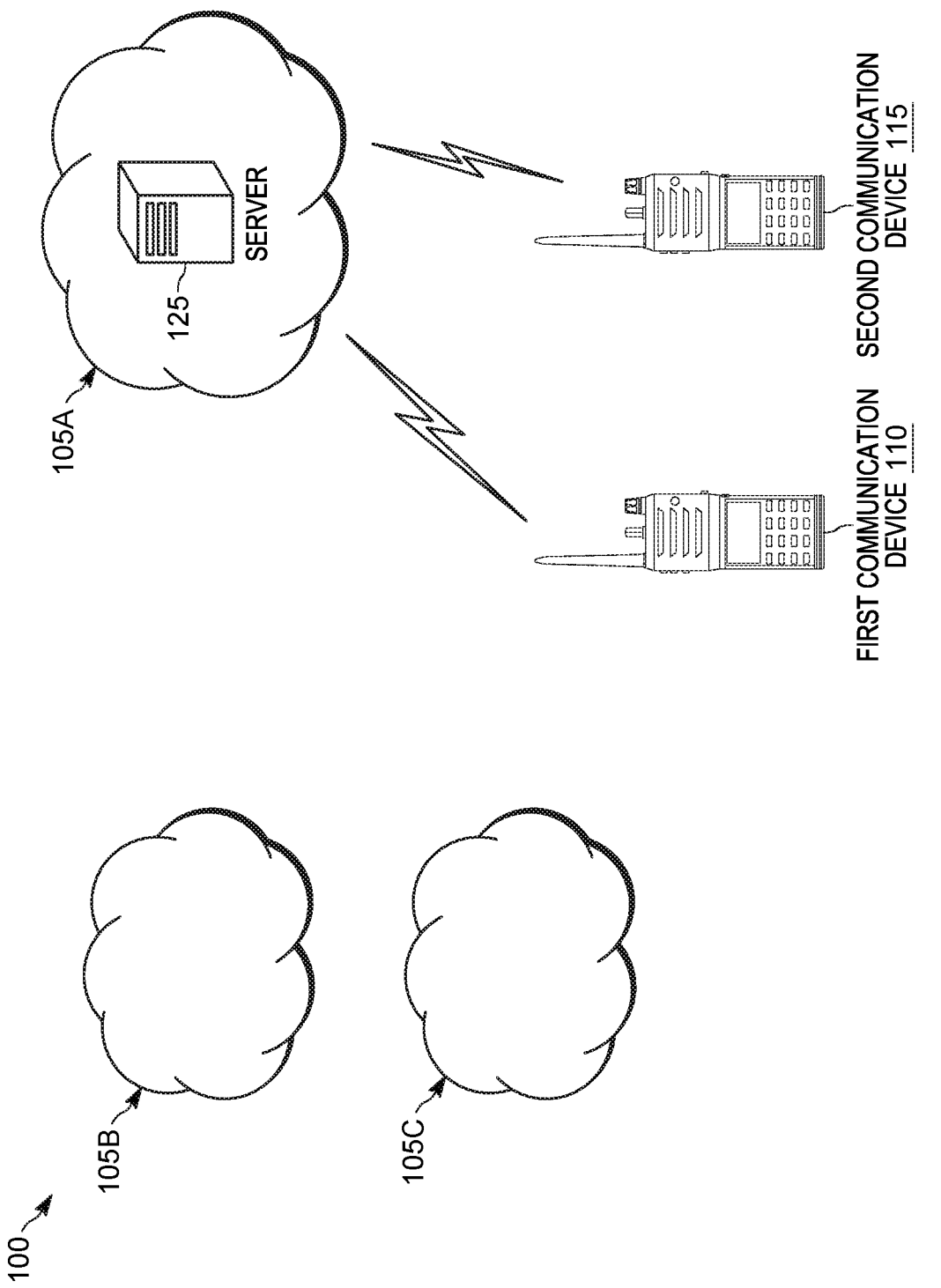
FIG. 1 is a diagram of a communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As mentioned above, communication systems will employ encryption to help secure communications between communications devices. The management of keys used in various communication systems, including public safety communication systems is important for a number of reasons. For example, it may be desirable to change keys periodically to make unauthorized access or interception of communications less successful. Management of key material may also involve coordination between disparate communication systems owners (or operators). Coordination is needed, for example, to help ensure that the systems operate in a segregated range of keys. Utilization of separate keymaps allows a single device to operate on disparate communication systems without the need to coordinate key material amongst those system owner/operators. In addition, coordination of key material may also help facilitate first responder communications, for example, when a first responder having a communications device registered with a Miami-Dade County network wants to communicate with a first responder having a device registered with a Broward County network.

Over the air rekeying (OTAR) is a technology that allows communication devices to receive keys. As the name implies, rekeying often involves substituting new keys for old keys. Generally, OTAR is implemented on a single system basis. In other words, each disparate communications network uses a single key management facility (KMF) to send new keys or rekey communication devices (sometimes referred to as "subscriber units" or "subscribers") registered with the network. However, it would be useful to have a system that allows or facilitates communication devices utilizing multiple, disparate systems. Among other things, some embodiments provide features that allow a subscriber unit to use and manage multiple keymaps, where the keymaps are assigned to disparate communications networks, for example different trunking or radio-frequency communication systems. Among other advantages, some embodiments, enable a subscriber unit to use a keymap for one system (for example, a Broward County network) and then mode switch to another system (for example, a Miami-Dade country network) and use a keymap for that system.

In some communication networks, for example, conventional and trunked land mobile radio (LMR) networks, push to talk (PTT) communications are used in talkgroups. A talkgroup is a group of communications devices, created by an administrator, in which each communications device in the talkgroup may participate in a group call. Group calls may be initiated and managed, for example, at a server. A PTT group call may be half-duplex meaning, audio from a single communications device is shared among the communications devices within the group. Each call occurs on a particular radio channel or plurality thereof.

As noted, a communications device may be associated with a different identity on disparate communication systems. For each radio communication system, the communications device uses key material from a keymap associated with and unique to the particular radio communication system (mutually exclusive to any key material associated with the other radio communication systems). Key material is used, for example, in securing communications between the communications devices operating on the particular radio communication system.

A communications device utilized in a trunked radio communication system of a first jurisdiction/area may be transported (for example, via a passenger automobile) to another jurisdiction/area (for example, in a different state) to work with a team there. The communications device may have an identity associated with the radio communication system of the second jurisdiction/area and, when the identity associated with that area is selected (for example, by the user), the key material associated with that area is utilized in communications that occur over the second radio communication system.

It may be desirable for a user of the communications device to be able to edit key material (referred to herein as key management operations) of one selected keymap while using another keymap for securing communications between devices of the currently selected communication system (in particular, a channel or channel(s) of the communication system). Communications between the communications devices and other communications devices in the currently selected communication network are referred to as traffic operations. Accordingly, the systems and methods described herein provide, among other things, improved user-experience in selecting a keymap for traffic operations and selecting another or the same keymap for key management operations (selecting, editing, loading, and/or deleting key material and/or keymaps of the communications device).

One example embodiment provides a portable communications device configured to communicate on multiple radio communication systems. The communications device includes a memory and an electronic processor electrically connected to the memory. The electronic processor is configured to store, in the memory, a plurality of keymaps. Each keymap of the plurality of keymaps corresponds to at least one of a particular communication system of the multiple radio communication systems and operates, in response to a user input, on a first radio communication system of the multiple radio communication systems. The electronic processor is also configured to manage traffic operations to and from the first radio communication system according to a first keymap of the plurality of keymaps corresponding to the first radio communication system when the electronic processor is operating on the first radio communication system. The electronic processor is also configured to perform a key management operation of a selected second keymap corresponding to a second radio communication system in response to receiving a command.

Another example embodiment provides a method of operating a portable communications device configured to communicate on multiple radio communication systems. The method includes storing, in a memory of the portable communications device, a plurality of keymaps, where each keymap of the plurality of keymaps corresponds to a particular communication system of the multiple radio communication systems. The method includes, operating, in response to a user input, on a first radio communication system of the multiple radio communication systems, managing traffic operations to and from the first radio communication system according to a first keymap of the plurality of keymaps corresponding to the first radio communication system when the device is operating on the first radio communication system, and performing a key management operation of a selected second keymap corresponding to a second radio communication system in response to receiving a command.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 illustrates an example communication network 100. The communications network 100 includes a radio communication system 105A, a first portable electronic communications device 110 and a second portable electronic communications device 115. The radio communication system 105A is configured to provide communications between the first communications device 110 and the second communications device 115. It should be understood that the communications network 100 may include additional devices configured similarly to the first communications device 110 and the second communications device 115.

The system 105A is a communications network and may include wireless and wired portions configured to support PTT communications. In some embodiments, the system 105A is or includes a radio access network that may operate according to an industry standard land mobile radio (LMR) or cellular protocol such as, for example, the Project 25 (P25) standard defined by the Association of Public Safety Communications Officials International (APCO), the TETRA standard defined by the European Telecommunications Standards Institute (ETSI), the Digital Private Mobile Radio (dPMR) standard also defined by the ETSI, the Digital Mobile Radio (DMR) standard also defined by the ETSI, the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented.

In some embodiments, the system 105A includes or is alternatively implemented using a wide area network, for example, the Internet; a local area network, for example, a Bluetooth™ network or a Wi-Fi network, and combinations or derivatives of the various networks mentioned or other networks. It should be understood that FIG. 1 depicts the system 105A in a simplified manner, and an actual implementation may include additional components to support other features. For example, the system 105A may include one or more base stations, repeaters, or both.

The system 105A includes a server 125. The server 125 is communicatively coupled to each of the communications devices 110 and 115. The server 125 is configured to manage communication among the communications devices 110 and 115. In some embodiments, system 105A includes hardware, software, or a combination of both configured to assign the first communications device 110 and the second communications device 115, other communications devices (not shown), or combinations thereof to one or more talkgroups (and their designated channel or channels) and to facilitate communications therebetween. For example, the server 125 may, upon receiving a request from one of the communications devices, establish PTT channels between two or more communications devices. In some embodiments, the system 105A includes more than one server. Functions of the server 125 may be dispersed over several separate devices (for example, additional servers and/or databases). In some embodiments, the server 125 is or includes a radio network infrastructure (RNI).

The first communications device 110 and the second communications device 115 transmit and receive voice and data to each other and to other communications devices (not shown) and servers (for example, server 125) via signals transmitted to and from the system 105A (in particular, the server 125). The communications devices 110 and 115 may each be any type of communications device capable of communicating over the system 105A. In some embodiments, one or more of the communications devices 110 and 115 may be different types of communications devices. The communications devices 110 and 115 may be, for example, hand-held radios, vehicle-mounted radios, dispatch radios, or other wireless communications devices compatible with the protocol of the radio communication system 105A.

The first communications device 110 is configured to communicate on multiple radio communication systems, including the communication system 105A. The multiple radio communication systems may include, for example, a second radio communication system 105B and a third radio communication system 105C, either or both of which may be configured similar to the system 105A. In some embodiments, the multiple radio communication systems include conventional radio communication systems (for example, using a dedicated channel for each group of users) and trunked radio communication systems (for example using a pool of channels which are available for many different groups of users).

It should be noted that while FIG. 1 illustrates one configuration of an embodiment of a communications network 100, in other embodiments, the communications network 100, or its components thereof, may have a different configuration. In some embodiments, there may be more or less communications devices communicatively coupled to the system 105A than are illustrated in FIG. 1. In addition, as described below, in some embodiments, the server 125 may be integrated into one or more of the communications devices 110 and 115.

Figure 2:
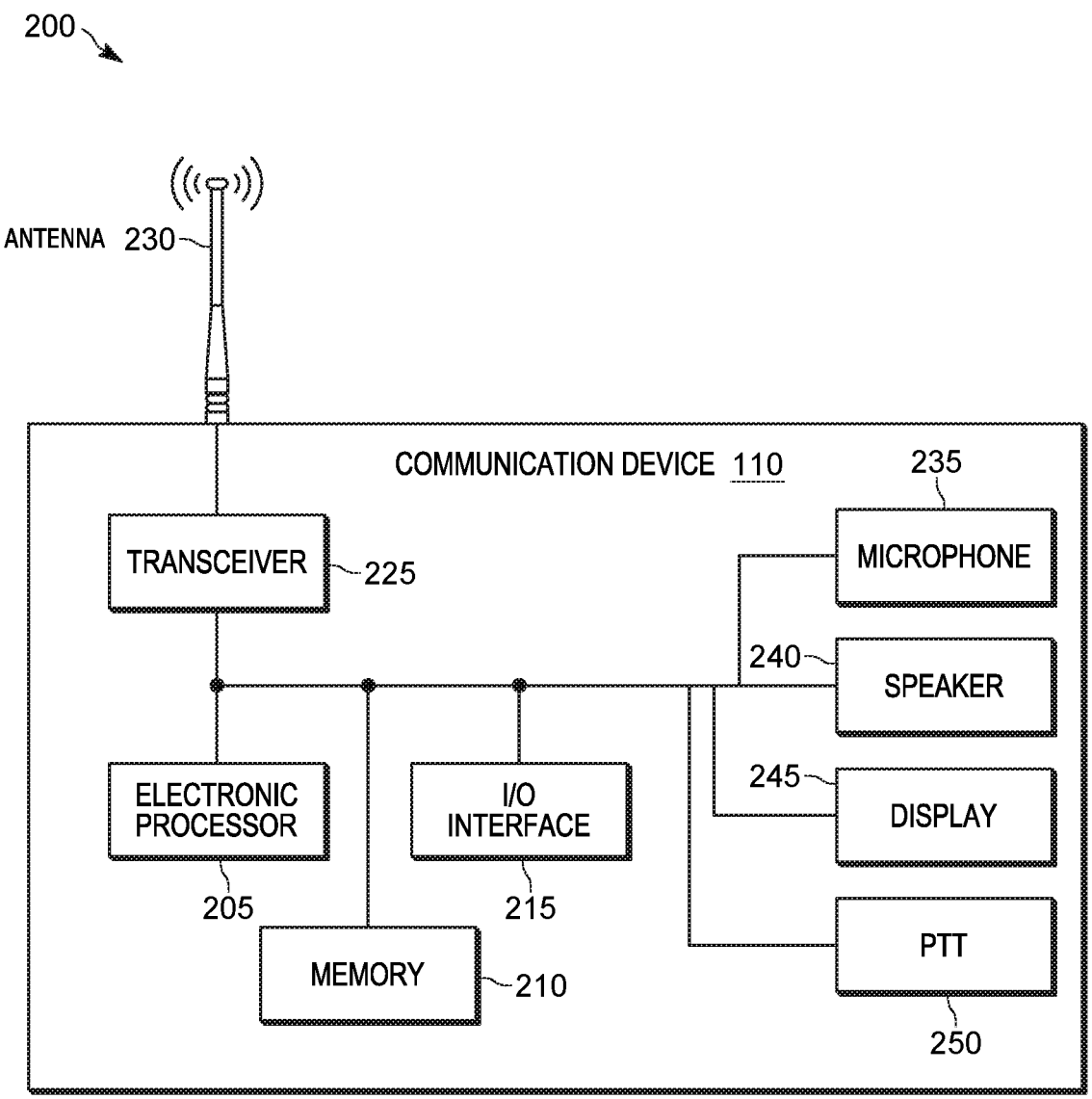
FIG. 2 is a diagram illustrating the communications device of the communication system of FIG. 1 in accordance with some embodiments.

FIG. 2 is a diagram 200 of the first communications device 110. In the embodiment illustrated, the communications device 110 includes an electronic processor 205, a memory 210, an input/output interface 215, a transceiver 225, an antenna 230, microphone 235, a loudspeaker 240, and a PTT selection mechanism 250. In some embodiments, the communications device 110 may additionally include a display 245.

The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. In some embodiments, the communications device 110 includes fewer or additional components in configurations different from that illustrated in FIG. 2. For example, in some embodiments, the communications device 110 includes multiple microphones, multiple speakers, or combinations thereof.

Figure 3:
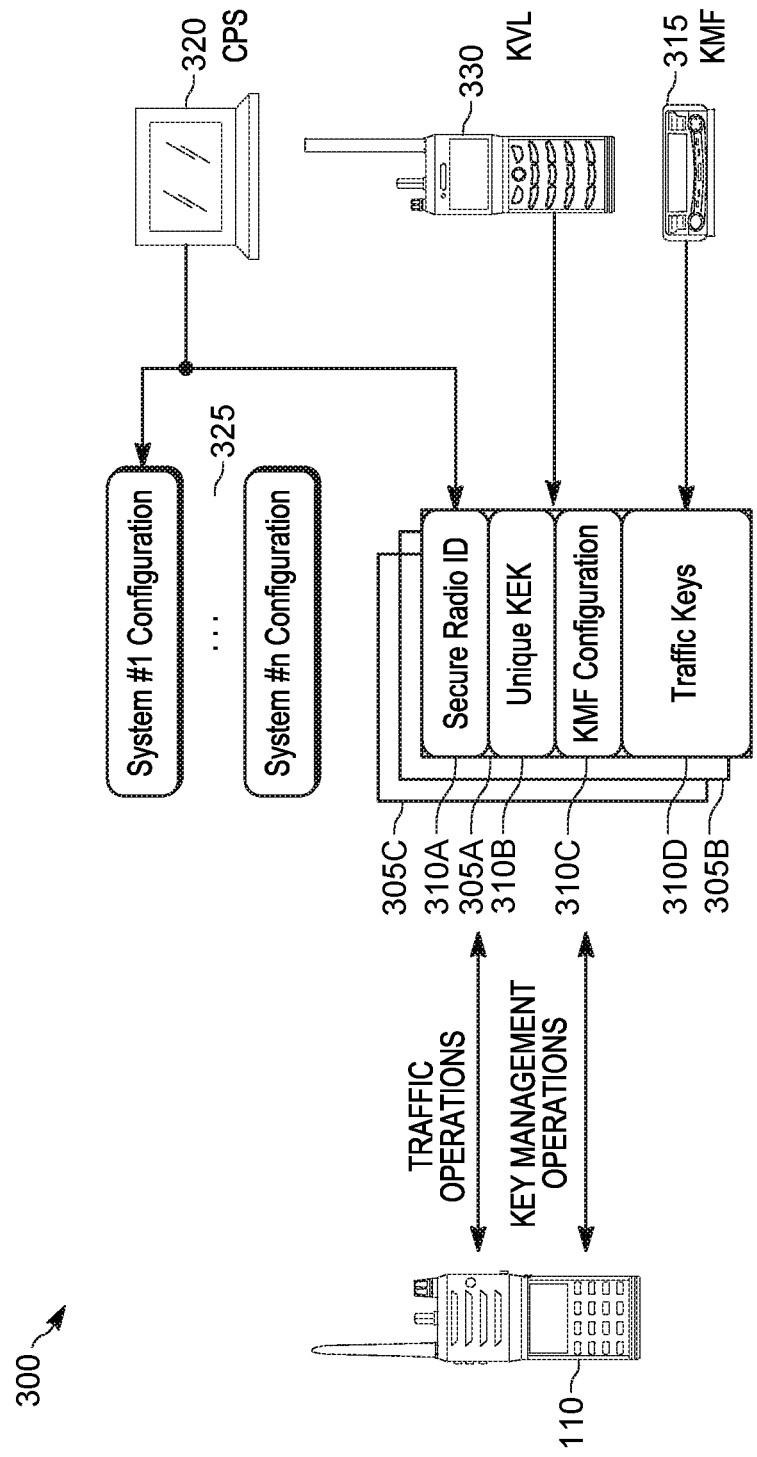
FIG. 3 is a diagram of a plurality of keymaps of a communications device included in the communication system of FIG. 1 in accordance with some embodiments.

The electronic processor 205 obtains and provides information (for example, from the memory 210 and/or the input/output interface 215), and processes the information by, for example, executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein. For example, as explained in more detail below, the memory 210 stores a plurality of keymaps 305 (FIG. 3). The memory 210 can include one or more non-transitory computer-readable media, and includes a program storage area and a data storage area. The program storage area and the data storage area can include combinations of different types of memory, as described herein. The electronic processor 205 may also include hardware capable of performing all or part of processes described herein.

The input/output interface 215 is configured to receive input and to provide system output. The input/output interface 215 obtains information and signals from, and provides information and signals to, (for example, over one or more wired and/or wireless connections) devices both internal and external to the second communications device 115.

The electronic processor 205 is configured to control the transceiver 225 to transmit and receive audio and other data to and from the communications device 110. The transceiver 225 transmits and receives radio signals to and from, for example, the system 105A using the antenna 230. The electronic processor 205 and the transceiver 225 may include various digital and analog components, which for brevity are not described herein and which may be implemented in hardware, software, or a combination of both. Some embodiments the transceiver 225 includes separate transmitting and receiving components, for example, a transmitter and a receiver, instead of a combined transceiver.

The microphone 235 is a transducer capable of sensing sound, converting the sound to electrical signals, and transmitting the electrical signals to the electronic processor 205. The electronic processor 205 processes the electrical signals received from the microphone 235 to produce an audio stream, which may be transmitted to other devices via the transceiver 225. The loudspeaker 240 is a transducer for reproducing sound from electrical signals (for example, generated from a received audio stream) received from the electronic processor 205. In some embodiments, the microphone 235, the loudspeaker 240, or both may be integrated in a single housing with the other components (for example, in a portable hand-held radio). In some embodiments, the microphone 235, the loudspeaker 240, or both are present in an accessory device (for example, a remote speaker microphone (RSM)) connected via a wired or wireless connection to the communications device 110.

The display 245 is a suitable display, for example, a liquid crystal display (LCD) touch screen, or an organic light-emitting diode (OLED) touch screen. In some embodiments, the communications device 110 implements a graphical user interface (GUI) (for example, generated by the electronic processor 205, from instructions and data stored in the memory 210, and presented on the display 245), that enables a user to interact with the communications device 110.

The PTT selection mechanism 250 allows a user of the communications device 110 to initiate PTT voice communications to one or more other communications devices, either directly or over the system 105A. For example, when the electronic processor 205 detects that the PTT selection mechanism 250 is enabled (for example, button press), the electronic processor 205 controls the transceiver 225 to transmit signals created by sound detected by the microphone 235 (for example, as a half-duplex communication signal). When the electronic processor 205 detects that the PTT selection mechanism 250 is no longer enabled (for example, has been released), the transceiver 225 stops transmitting the signals. In some embodiments, the PTT selection mechanism 250 is a mechanical button, key, switch, or knob. In some embodiments, the PTT selection mechanism 250 is provided as part of a graphical user interface (for example, a virtual button) presented on the display 245. The PTT selection mechanism 250 may also allow a user of the communications device 110 to select a communication system to communicate on (for example, via a knob or a virtual selection on the graphical user interface). The PTT selection mechanism 250 may include more than one mechanism for user input. For example, the PTT selection mechanism 250 may include a PTT button and a rotatable knob for channel selection. The communication device 110 may include additional user input interfaces (for example, a mechanical button, a keyboard, switch, and the like) for receiving additional commands from a user of the device 110 related to PTT communications (changing communication channels, initiating PTT communications, enabling scan, initiating key selections, deletions, manual keyset changeovers, OTAR rekey requests and the like). The second communications devices 115 (as well as any additional communications devices of the system 105) may be configured in a manner that is similar to the way in which the first communications device 110 is configured.

FIG. 3 is a block diagram 300 of a plurality of keymaps 305A-C of the first communications device 110 in accordance with some embodiments. As mentioned above, the memory 210 of the communications device 110 is configured to store a plurality of keymaps 305A-305C. As also described above, each keymap of the plurality of keymaps 305A-305C correspond to at least one of a particular communication system of the multiple radio communication systems that the communications device 110 is configured to communicate on.

Each keymap of the plurality of keymaps 305A-305C include configuration information and key material (collectively referred to herein as key material) unique to the communication system that they correspond to. For example, as shown in keymap 305A, the key material may include a radio identifier 310A, one or more key encryption keys (KEK) 310B, key management facility (KMF) configuration information 310C, and one or more traffic keys 310D. The radio identifier 310A is a unique tag in which the communications device 110 corresponds to in the communication system in which the active keymap is associated with. The KEK(s) 310B are one or more keys used to encrypt and/or decrypt other keys (for example, the traffic keys 310D) during OTAR operations. The KMF configuration information 310C is configuration information and parameters for communications between the communications device 110 and the key management facility 315, explained in more detail below. The traffic keys 310D are keys used to encrypt and/or decrypt information to and from the communications device 110.

The particular information of the key material is exclusive to the communication system in which the keymap (here, keymap 305A) is associated with. For example, the radio identifier 310A of the keymap 305A may be different than a radio identifier of keymap 305B. In some embodiments, some of the information of the key material of a first keymap (for example, keymap 305A) may be similar to that of another keymap (for example, keymap 305B).

A customer programming software (CPS) 320 establishes the radio identifier 310A for the communications device 110. The CPS 320 also configures the multiple communication systems to each have a keymap associated with them (system configurations 325). The communications device 110 is able to navigate between systems, as described above, based on user input via the PTT selection mechanism 250 (for example, a rotation of the mechanism 250 or via a graphical interface). The particular CPS 320 may differ for one or more keymaps. A key variable loader (KVL) 330 provides the KEKs 310B, traffic keys 310D, and KMF configuration information 310C to the communications device 110. This may be done, for example, via a hardware connection via input/output interface 215. The key management facility (KMF) 315 provides the one or more traffic keys 310D to the communications device 110 for secure communications over the related radio communication system. In some embodiments, the CPS 320 is configured to perform some or all of the functionality of the KMF 315 and/or KVL 330. In some embodiments, the KMF 315, KVL 330, and the CPS 320 are part of the communication network 100 and/or communication system 105A.

Figure 4:
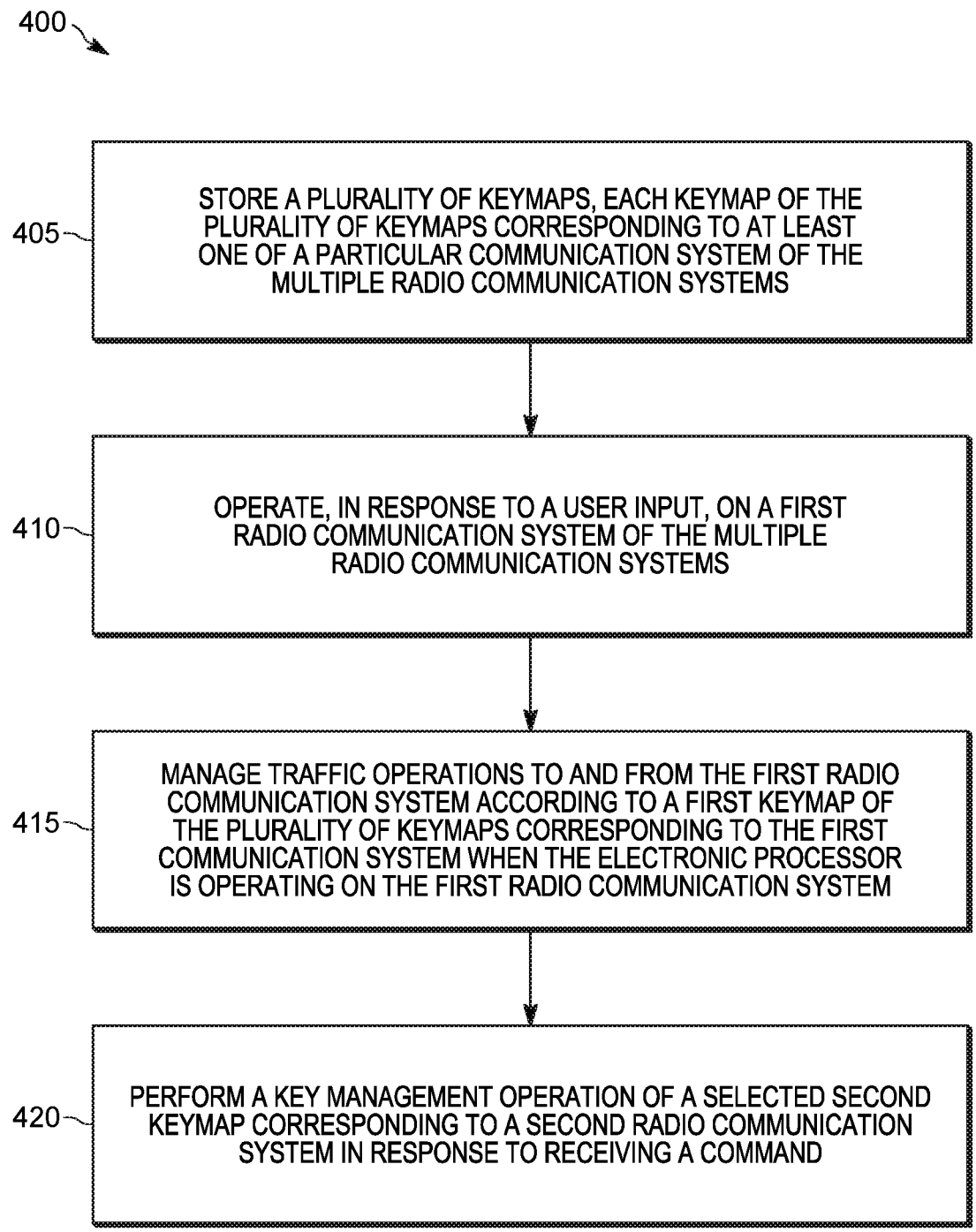
FIG. 4 is a flowchart of a method for managing keymaps of the communications device of FIG. 2 in accordance with some embodiments.

FIG. 4 is a flowchart illustrating a method or procedure 400 for operating a portable communications device (for example, the communications device 110) configured to communicate on multiple radio communication systems in accordance to some embodiments. As an example, the method 400 is explained in terms of the communications device 110, in particular the electronic processor 205. However, it should be understood that portions of the method 400 may be distributed among multiple devices (for example, between the server 125 and one or more of the communications device 110 and 115). It should also be understood that, while the method 400 is described in regard to the first communications device 110, in some embodiments, the method 400 may be applied to additional communications devices (for example, the second communications device 115).

At block 405, the processor 205 stores, in the memory 210, a plurality of keymaps (for example, keymaps 305A-305C), each keymap of the plurality of keymaps 305A-305C corresponding to at least one of a particular communication system of the multiple radio communication systems. At block 410, the processor 205 operates, in response to a user input, on a first radio communication system of the multiple radio communication systems. The processor 205 accordingly, at block 415, manages traffic operations to and from the communications device 110 according to a first keymap (for example, keymap 305A) of the plurality of keymaps 305A-305C corresponding to the first radio communication system 105A when the electronic processor 205 is operating on the first radio communication system (for example, communication system 105A). In other words, the communications device 110 performs communications between one or more devices of the radio communication system (for example, the second communications device 115 of the radio communication system 105A) using key material of the keymap 305A corresponding to that radio communication system 105A.

At block 420, the processor 205 performs a key management operation of a selected second keymap (for example, keymap 305B) corresponding to a second radio communication system (for example, communication system 105B) separate from the radio communication system 105A, in response to receiving a command. The command may be either of a user input (for example, via a graphical user interface) or a remote command (for example, a command from the server 125 or KMF 315). As mentioned above, a key management operation is a modification of one or more keys of a keymap (here, keymap 305B). A key management operation may be one or more of rekeying, loading a key, deleting a key, changing a keyset, user key selection, user key erase, user keyset changeover, KVL key management, and/or OTAR key management. Thus, the communications device 110 is able to perform traffic operations according to a first keymap 305A while a user of the communications device is able to perform key management operations on a second keymap 305B.

In some embodiments, the electronic processor 205 is further configured to execute a scan mode. In scan mode, the processor 205 searches for and selects at least one radio channel associated with one or more of the multiple radio communication systems in response to detecting that the at least one radio channel includes information (data and/or voice). In scan mode, the communications device 110 remains on the current selected channel of the first radio communication system 105A (the communication channel selected by a user that the communications device is on prior to activating the scan mode) while searching for a channel that has voice information on it that the communications device "lands on" and joins (referred to as a landed channel). In some embodiments, the scan mode is where the electronic processor 205 searches for and selects at least one radio channel associated with one or more of the multiple radio communication systems that the communications device 110 is associated with that includes voice information. The processor 205 may then automatically selects and use a third keymap (for example, keymap 305C) from the plurality of keymaps for traffic operations (similar to block 415) in response to detecting voice information on at least one radio channel associated with the third radio communication system 105C (the landed channel). It should be understood that the second radio communication system 105B may also be included in the scan and selected should voice information be detected on at least one of its channels.

In some embodiments, in scan mode, the communications device 110 scans for data activity on a designated data channel and receives data (for example, APCO 25 CAI data packets) separate or in addition to a voice scan. The electronic processor 205 may be configured to search for data on at least one radio channel associated with a radio communication system (here, the third radio communication system 105C) and automatically search for, select (upon detecting data activity on the landed channel), and use the third keymap 305C for traffic operations when the third keymap 305C is associated with a designated data member. The designated data member is a preselected/preconfigured channel of a particular communication system (in the present example, the third radio communication system 105C). By preselecting a particular channel (designating one or limiting the number of data channels), the scan algorithm can optimize performance by only remaining on the pre-configured data channel while empty preamble data is present. In other words, the processor 205 is able to find voice channel activity faster, as it may be time-consuming to scan numerous channels for data. Accordingly, the processor 205 may use the third keymap for key management operations when the third keymap is associated with the designated data member. When there is no designated data member, the processor 205 may perform key management operations according to the channel which uses the first keymap of the first radio communication system.

Accordingly, the correct key material may be used by the communications device 110 for the landed channel for traffic operations while it may be desirable to use the keymap of the selected channel for key management operations instead of the keymap of the landed channel. However, when a data scan mode is active (scanning for a designated data channel rather than a voice channel), the communications device may receive over-the-air rekeying (OTAR) updates on the landed data channel and so it may then be preferable to use the keymap associated with the data channel for key management operations instead of using the selected channel.

In some embodiments, the processor 205 is further configured to perform Project 25 Inter RF Subsystem Interface (ISSI) operations. ISSI operations allow radio communication systems built by different manufacturers to be connected together into wide area networks. This allows devices on different systems/networks to communicate with each other via interoperability talkgroups. The wide area network connections using ISSI provide an extended coverage area for communications devices that are roaming. This may be useful, for example, for public safety responders that provide assistance in other jurisdictions during an emergency.

When the communications device 110 is configured to perform ISSI operations, the communications device 110 may roam into another communication system (a "foreign" radio communication system) but still communicate on a talkgroup of a radio communication system (for example, a "home" radio communication system) the communications device 110 is part of by joining an interoperability talkgroup. For interoperability, the communication device 110 may also be configured to operate on a talkgroup (a "foreign" talkgroup) of a radio communication system that the device is not a part of.

Figure 5:
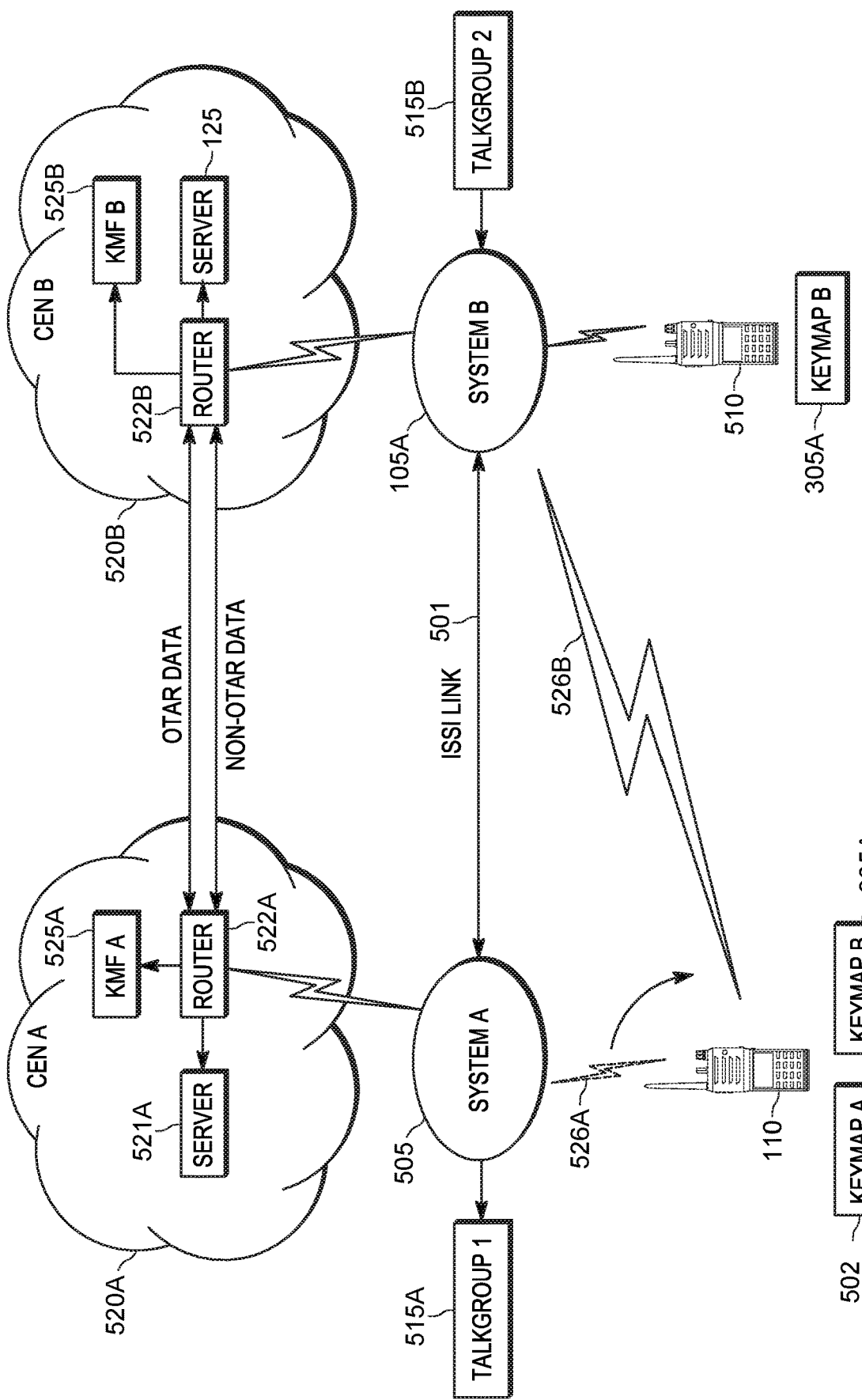
FIG. 5 is a diagram of a home communication system and a foreign communication system of the communications device of FIG. 2 in accordance with some embodiments.

FIG. 5 illustrates a radio communication system 505 and the radio communication system 105A coupled via an ISSI link 501. The radio communication system 505 is the home system for communications device 110 and the communication system 105A is a foreign system to the communications device 110. The communication system 105A is the home system for a communications device 510. In the illustrated example, the communications device 110 is configured to roam and operate on the communication system 105A. As shown in FIG. 5, the communication system 505 homes a first talkgroup 515A and the communication system 105A homes a second talkgroup 515B. The second talkgroup 515B is used as an interoperability talkgroup. The second talkgroup 515B is a foreign talkgroup for device 110 while it is a home talkgroup for the communications device 510.

Each of the systems 505 and 105A may be communicatively coupled to a customer enterprise network (CENs 520A and 520B respectively). Each of the CENs 520A and 520B include one or more data servers (servers 521A and 125 respectively) and routers (522A and 522B respectively) utilized by their respective communication system 505 and 105A respectively. The routers 522A and 522B may communicate both OTAR and non-OTAR data to each other. The communications device 110 uses CEN 520A and would be managed by KMF 525A. The communications device 510 of radio communication system 105A would use CEN 520B and be managed by KMF 525B.

When the communications device 110 is configured to use its respective home talkgroup (arrow 526A), the communications device 110 uses the keymap associated with that home system (here, system 505) for both traffic operations and key management operations. When the communications device 110 is configured to use a foreign talkgroup, the communications device 110 is configured to use an alternate keymap for traffic operations and (potentially) also use that alternate keymap for key management operations.

For example, when device 110 is operating on the talkgroup 515A (a home talkgroup), the communications device 110 uses the keymap 502 associated with the radio communication system 505. When device 110 roams over to communication system 105A (arrow 526B), the rekeying data (for example, OTAR data) is routed back to KMF 525A of CEN 520A. When communications device 110 is operating on the second talkgroup 515B (a foreign talkgroup), regardless of which communication system it is on, the communications device 110 may be configured to use keymap 502 or the keymap 305A of the system 105A for management-operations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A portable communications device configured to communicate on multiple radio communication systems, the communications device comprising:
    a memory; and
    an electronic processor electrically connected to the memory and configured to
        store, in the memory, a plurality of keymaps, each keymap of the plurality of keymaps corresponding to at least one of a particular communication system of the multiple radio communication systems;
        operate, in response to a user input, on a first radio communication system of the multiple radio communication systems; and
        manage traffic operations to and from the first radio communication system according to a first keymap of the plurality of keymaps corresponding to the first radio communication system when the electronic processor is operating on the first radio communication system, while simultaneously performing a key management operation according to a selected second keymap corresponding to a second radio communication system in response to receiving a command.

2. The communications device of claim 1, wherein the electronic processor is further configured to
    execute a scan mode where the electronic processor searches for and selects at least one radio channel associated with one of the multiple radio communication systems that includes voice information, and
    automatically select and use a third keymap from the plurality of keymaps for traffic operations in response to the electronic processor detecting voice information on at least one radio channel associated with a third radio communication system.

3. The communications device of claim 1, wherein the electronic processor is further configured to
execute a scan mode where the electronic processor searches for data on at least one radio channel associated with one of the multiple radio communication systems, and
automatically searching for, selecting, and using the second keymap for traffic operations when the second keymap is associated with a designated data member.

4. The communications device of claim 3, wherein the electronic processor is further configured to use the second keymap for key management operations when the second keymap is associated with the designated data member and, when there is no designated data member, perform key management operations according to the first keymap of the first radio communication system.

5. The communications device of claim 1, wherein the key management operation on key material of the selected second keymap is at least one selected from the group consisting of rekeying, loading a key, deleting a key, changing a keyset, user key selection, user key erase, user keyset changeover, KVL key management, and OTAR key management.

6. The communications device of claim 1, wherein the multiple radio communication systems include conventional radio communication systems and trunked radio communication systems.

7. The communications device of claim 1, wherein the electronic processor is further configured to operate in an ISSI mode and wherein the first radio communication system is a foreign system and the second radio communication system is a home system of the communications device.

8. The communications device of claim 1, wherein the electronic processor is further configured to, when operating on a talkgroup of the home system, use the first keymap of the first radio communication system for key management operations, and, when operating on a talkgroup of the foreign system, based on a configuration, use either the first keymap of the first communication system or the second keymap of the second communication system for traffic operations.

9. A method of operating a portable communications device configured to communicate on multiple radio communication systems, the method comprising:
storing, in a memory of the communications device, a plurality of keymaps, each keymap of the plurality of keymaps corresponding to at least one of a particular communication system of the multiple radio communication systems;
operating, in response to a user input, on a first radio communication system of the multiple radio communication systems; and
managing traffic operations to and from the first radio communication system according to a first keymap of the plurality of keymaps corresponding to the first radio communication system when the device is operating on the first radio communication system, while simultaneously performing a key management operation according to a selected second keymap corresponding to a second radio communication system in response to receiving a command.

10. The method of claim 9, the method further comprising executing a scan mode including searching for and selecting at least one radio channel associated with one of the multiple radio communication systems that includes voice information, and
automatically selecting and using a third keymap from the plurality of keymaps for traffic operations in response to detecting voice information on at least one radio channel associated with a third radio communication system.

11. The method of claim 9, the method further comprising executing a scan mode including searching for data on at least one radio channel associated with one of the multiple radio communication systems, and
automatically searching for, selecting, and using the second keymap for traffic operations when the second keymap is associated with a designated data member.

12. The method of claim 11, the method further comprising using the second keymap for key management operations when the second keymap is associated with the designated data member and, when there is no designated data member, perform key management operations according to the first keymap of the first radio communication system.

13. The method of claim 9, wherein the key management operation on key material of the selected second keymap is at least one selected from the group consisting of rekeying, loading a key, deleting a key, changing a keyset, user key selection, user key erase, user keyset changeover, KVL key management, and OTAR key management.

14. The method of claim 9, wherein the multiple radio communication systems include conventional radio communication systems and trunked radio communication systems.

15. The method of claim 9, wherein the portable communications device is configured to operate in an ISSI mode and wherein the first radio communication system is a foreign system and the second radio communication system is a home system of the communications device.

16. The method of claim 9, the method further comprising, when operating on a talkgroup of the home system, using the first keymap of the first radio communication system for key management operations, and, when operating on a talkgroup of the foreign system, based on a configuration, using either the first keymap of the first communication system or the second keymap of the second communication system for traffic operations.

\* \* \* \* \*